US007294981B2

(12) United States Patent
Marty

(10) Patent No.: US 7,294,981 B2
(45) Date of Patent: Nov. 13, 2007

(54) METHOD OF DETERMINING THE POSITION OF THE SHAFT OF A DRIVE MOTOR FOR A ROLLER BLIND

(75) Inventor: Jacques Marty, Montredon Labessonnie (FR)

(73) Assignee: Siminor Technologies Castres Sarl, Castres (FR)

( * ) Notice: Subject to any disclaimer, the term of this patent is extended or adjusted under 35 U.S.C. 154(b) by 0 days.

(21) Appl. No.: 11/302,904

(22) Filed: Dec. 14, 2005

(65) Prior Publication Data

US 2006/0138982 A1 Jun. 29, 2006

(30) Foreign Application Priority Data

Dec. 24, 2004 (FR) .................................. 04 13892

(51) Int. Cl.
*H02P 7/06* (2006.01)
*H02K 21/00* (2006.01)

(52) U.S. Cl. ...................... 318/254; 318/139; 318/439; 318/558

(58) Field of Classification Search ................ 318/138, 318/245, 254, 439, 600–603, 558; 324/166, 324/200

See application file for complete search history.

(56) References Cited

U.S. PATENT DOCUMENTS 3,603,977 A * 9/1971 Szabo et al. ................ 341/152
4,238,717 A * 12/1980 Knight et al. ............... 318/254
4,492,903 A * 1/1985 Knight et al. ............... 318/254
4,656,404 A * 4/1987 Klinchurch ................. 318/558
4,792,714 A * 12/1988 Schlieter ..................... 310/234
4,839,646 A 6/1989 Tyson
H939 H * 7/1991 Holland ...................... 324/166
5,038,087 A 8/1991 Archer et al.
5,111,095 A * 5/1992 Hendershot ................. 310/168
5,202,614 A * 4/1993 Peters et al. ................ 318/254
5,202,616 A * 4/1993 Peters et al. ................ 318/254
5,382,889 A * 1/1995 Peters et al. ................ 318/254
6,236,175 B1 5/2001 Mourad et al.
2006/0208722 A1* 9/2006 Takemasa et al. .......... 324/200

FOREIGN PATENT DOCUMENTS

EP 1 333 150 A 8/2003
FR 2790885 A1 * 9/2000
JP 2006187193 A * 7/2006

* cited by examiner

*Primary Examiner*—Paul Ip
(74) *Attorney, Agent, or Firm*—Frommer Lawrence & Haug LLP; Ronald R. Santucci

(57) ABSTRACT

The method of determining the position of the shaft of a direct current motor including an armature powered via brushes and a bar commutator and designed to drive a roller blind includes the following phases:

detecting and counting the commutations that occur between the brushes and the commutator bars to determine the position of the motor shaft when the commutation count is valid, and measuring the back electromotive force of the motor to determine the position of the motor shaft when the commutation count is not valid.

13 Claims, 2 Drawing Sheets

METHOD OF DETERMINING THE POSITION OF THE SHAFT OF A DRIVE MOTOR FOR A ROLLER BLIND

This application claims priority benefits from French Patent Application No. 04 13892 filed Dec. 24, 2004.

BACKGROUND OF THE INVENTION

The invention relates to a method of determining the position and/or the speed of the shaft of a direct current motor, including an armature powered via brushes and a bar commutator and designed to drive a moving element of a building. It also concerns an actuator for implementing such a method.

Some actuators for operating moving elements such as doors, gates, shutters, blinds, projection screens, ventilation shutters in buildings include direct current motors with armature-powering brushes.

To control the operation of these moving elements, it is beneficial to know their position in order to determine when the motor power supply needs to be cut off at the end of travel of the element or when the latter is in an intermediate position.

DESCRIPTION OF THE PRIOR ART

U.S. Pat. No. 5,038,087, the content of which is herein incorporated by reference, discloses a method applying to a direct current motor with brushes on the armature for determining, by counting, the deployed position of a blind, for which the retracted position is detected by motor end stop. The position is calculated by counting the commutations of the commutator bars on the brushes of the motor. However, such a counting method is not reliable, in particular when the motor operates at low speed or off load.

Patent application EP 1 333 150 discloses correction procedures for partially resolving the problems raised by such methods.

The lack of reliability is more marked in applications where the power supply voltage of the motor is supplied by a converter powered from the mains alternating current network, for example 230 V, 50 Hz. In practice, the inexpensive converters radiate a component having a high intensity, at least at a frequency twice that of the alternating current network. When the frequency of these radiated interference signals is close to the brush commutation frequency, their discrimination is very difficult, even impossible.

Chopper devices for reducing the speed or the power of the motor when the moving element comes close to a stop position also represent a source of interference signals.

Moreover, U.S. Pat. No. 6,236,175, the content of which is herein incorporated by reference, discloses a method of measuring the speed of a direct current motor from the measurement of the back electromotive force of the motor. However, the back electromotive force coefficient KEMF, reflecting the proportionality between the back electromotive force and the rotation frequency of the motor, is not constant from one motor to another, nor, moreover, for one and the same motor, in particular because it depends on the magnetic flux created by the induction magnets and this flux drops very significantly with temperature. Now, in a doorway or garage door application, the temperature of the motor can vary, in winter, from −15° C. to +80° C. in a few operating cycles.

SUMMARY OF THE INVENTION

The object of the invention is to provide a method of determining the position and/or the rotation speed of a motor shaft mitigating the abovementioned drawbacks and providing enhancements compared to the methods known from the prior art. In particular, the method according to the invention can be used to calculate accurately, by counting, the position and/or the rotation speed of a motor. The object of the invention is also to provide an actuator for implementing this method.

The method according to the invention is characterized in that includes the following phases:

- detecting and counting the commutations that occur between the brushes and the commutator bars to determine the position and/or the speed of the motor shaft when the commutation count is valid, and
- measuring the back electromotive force of the motor to determine the position and/or the speed of the motor shaft when the commutation count is not valid.

Different ways of executing the method are defined by the dependent claims 2 to 12.

The actuator according to the invention is used to operate a moving element of the building. It comprises a direct current motor with an armature powered via brushes and a bar commutator, and means of counting commutations between the brushes and the bars of the commutator. It is characterized in that it includes means of measuring the back electromotive force of the motor and means of inhibiting the use of the commutation counting means or the use of the means of measuring the back electromotive force of the motor to calculate the position and/or the speed of the motor shaft.

BRIEF DESCRIPTION OF THE DRAWINGS

The appended drawing represents, by way of example, a way of executing the method of determination according to the invention and an embodiment of an actuator according to the invention.

DESCRIPTION OF THE PREFERRED EMBODIMENTS

Figure 1:
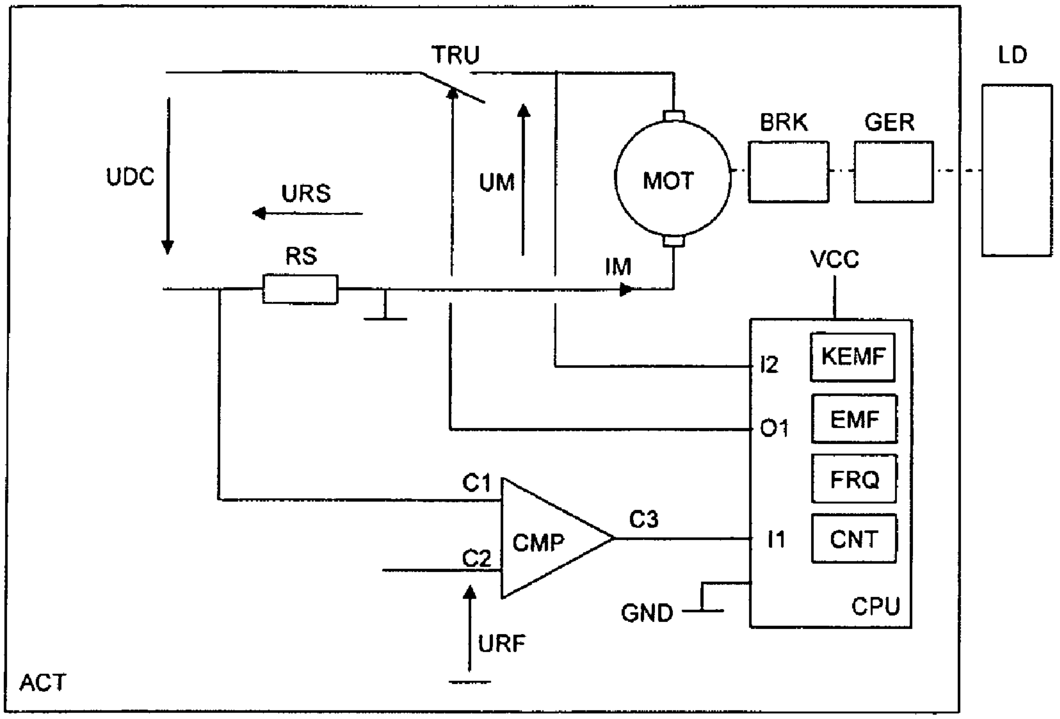
FIG. 1 is a diagram of an embodiment of an actuator according to the invention.

The actuator ACT represented in FIG. 1 is intended to drive a moving element LD equipping a building. It comprises a direct current motor MOT of the wound-rotor type, with commutator and brushes. The inductor preferably comprises permanent magnets on the stator. The motor is linked kinematically to the moving element via a release brake BRK which is used to immobilize the motor shaft when the motor is not powered in order to prevent the latter being driven by the load. The motor is also linked to the load via a reducing gear GER.

The motor MOT is powered from a direct current voltage UDC, supplied by a battery or by a converter, not shown. This voltage UDC is applied to the terminals of the motor using power supply control means including a microcontroller CPU controlling the commutation means, not shown, for rotating the motor in a first direction or in a second direction. The microcontroller is linked to a command receiver, not shown, for detecting commands sent following an action carried out by a user or following an event detected by a logic control device.

One function of the control means is to cut the power supply to the motor when the shaft of the latter has reached a particular position, corresponding, for example, to a predefined intermediate position or an end-of-travel position of the moving element LD.

The position of the motor shaft, and therefore that of the driven moving element, is measured by counting. The control means also cause the motor power supply to be switched off and, possibly, provoke a brief reverse power supply moment to enable a reverse motion of the moving element if an obstacle is detected. This obstacle detection can, for example, be based on detection of an abnormal slowing-down of the motor. The control means must therefore allow for the position and speed of the moving element to be calculated as accurately as possible.

The microcontroller has an output O1 for controlling the frequency or the duty cycle of a controlled switch TRU connected in series with the motor. This controlled switch is, for example, an MOS transistor, the gate of which is directly connected to the output O1 of the microcontroller. This output is, for example, a PWM type output. The operation of the switch is of step-down chopper type: the armature voltage UM applied to the armature of the motor has a mean value less than the power supply voltage UDC. Thus, it is possible to undertake operating phases at reduced voltage and to produce voltage step-up or voltage step-down ramps to implement gradual motor acceleration or deceleration phases.

The armature current IM is measured using a shunt resistor RS of low value, one terminal of which is linked to a first armature terminal of the motor and to the electrical ground GND. Thus, the measurement voltage URS at the terminals of the shunt is low compared to the power supply voltage of the motor UDC.

A detection device with at least one comparator CMP for transforming the armature current IM fluctuations provoked by the commutations of the commutator bars as they pass over the brushes into two-level (high and low) logic signals.

The output C3 of the comparator CMP is connected to a first input I1 of the microcontroller. This input is of digital type: the logic pulses correspond to the commutations of the commutator. These pulses are algebraically summed (counted positively when the motor rotates in a first direction and counted negatively when the motor rotates in a second direction) in a counter CNT which consequently gives the image of the position of the moving element. The frequency of the pulses is also calculated. This frequency is the image of the instantaneous speed of the motor and therefore of that of the moving element. This frequency is stored in a memory FRQ of the microcontroller.

A second input I2 of the microcontroller is of analog type. It can be, for example, the input of an analog/digital converter incorporated in the microcontroller. The second input I2 is linked to the second armature terminal of the motor. Since the ground of the circuit is linked to the first armature terminal of the motor, the voltage measured by the analog/digital converter is therefore the armature voltage UM of the motor.

It is known that this voltage is strictly equal to the back electromotive force when the armature current IM is zero, that is, when the controlled switch TRU is open for a sufficient time. The periodic opening of the controlled switch TRU is consequently used to measure accurately the back electromotive force of the motor, the value of which is stored in a memory referenced EMF.

Figure 2:
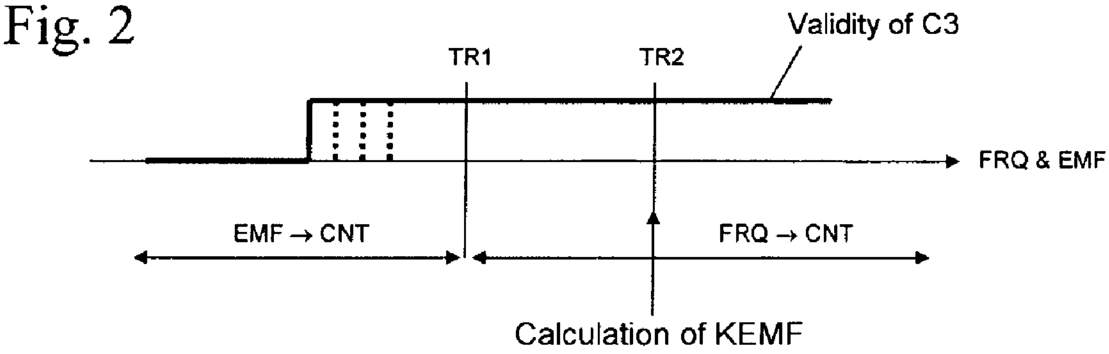
FIG. 2 is a diagram illustrating the principle of the method of determination according to the invention.

FIG. 2 diagrammatically represents the area of validity of the pulse measurement result at the output C3 of the comparator CMP.

There is at least one area in which the signal from the output C3 cannot be validly considered to calculate the position and/or the speed of the motor shaft: either because of too low a signal/noise ratio, or because the motor is slightly driven by the load and absorbs a zero current (in this latter case, measuring the commutations is not possible). The limit LIM of this area is not determined accurately, as symbolized by the broken vertical lines.

The determination of the position of the motor shaft is carried out by counting as long as the speed of the shaft (therefore the commutation frequency VFRQ) is greater than a first threshold TR1. When the speed of the load becomes less than this threshold, then it is the back electromotive force that is used: the speed is obtained by determining the value of the back electromotive force and by dividing it by the coefficient VKEMF. The integration of the speed gives the position of the motor shaft and therefore the position of the moving element.

In a simplified manner, by taking a constant time step to calculate the algebraic sum Σ, the value VCNT stored in the counter CNT is:

$$VCNT=\Sigma(VEMF/VKEMF)$$

Thus, the counter CNT which reflects the position of the moving element therefore has two incrementation and decrementation sources: the pulses from the output C3 of the comparator when the speed of the motor shaft is greater than the threshold speed TR1 and the integration of the speed calculated from the back electromotive force when the speed of the motor shaft is less than the threshold speed TR1.

The coefficient VKEMF is calculated when the motor shaft has reached a speed TR2, preferably greater than the speed threshold TR1: there is thus an assurance that, when the coefficient VKEMF is calculated, the signal from the output C3 of the comparator has a frequency equal to the frequency of the commutations that occur between the brushes and the bars of the commutator.

The coefficient VKEMF is:

VKEMF=VEMF/VFRQ with VEMF: back electromotive force value stored in the memory EMF and VFRQ: value of the frequency of the signal from the output C3 stored in the memory FRQ.

VKEMF is then logged in a memory KEMF. This value of the back electromotive force coefficient is therefore related to the temperature of the motor at the time of the measurement, and corresponds to a virtually exact value for the next time interval since the heating effects are not instantaneous.

Figure 3:
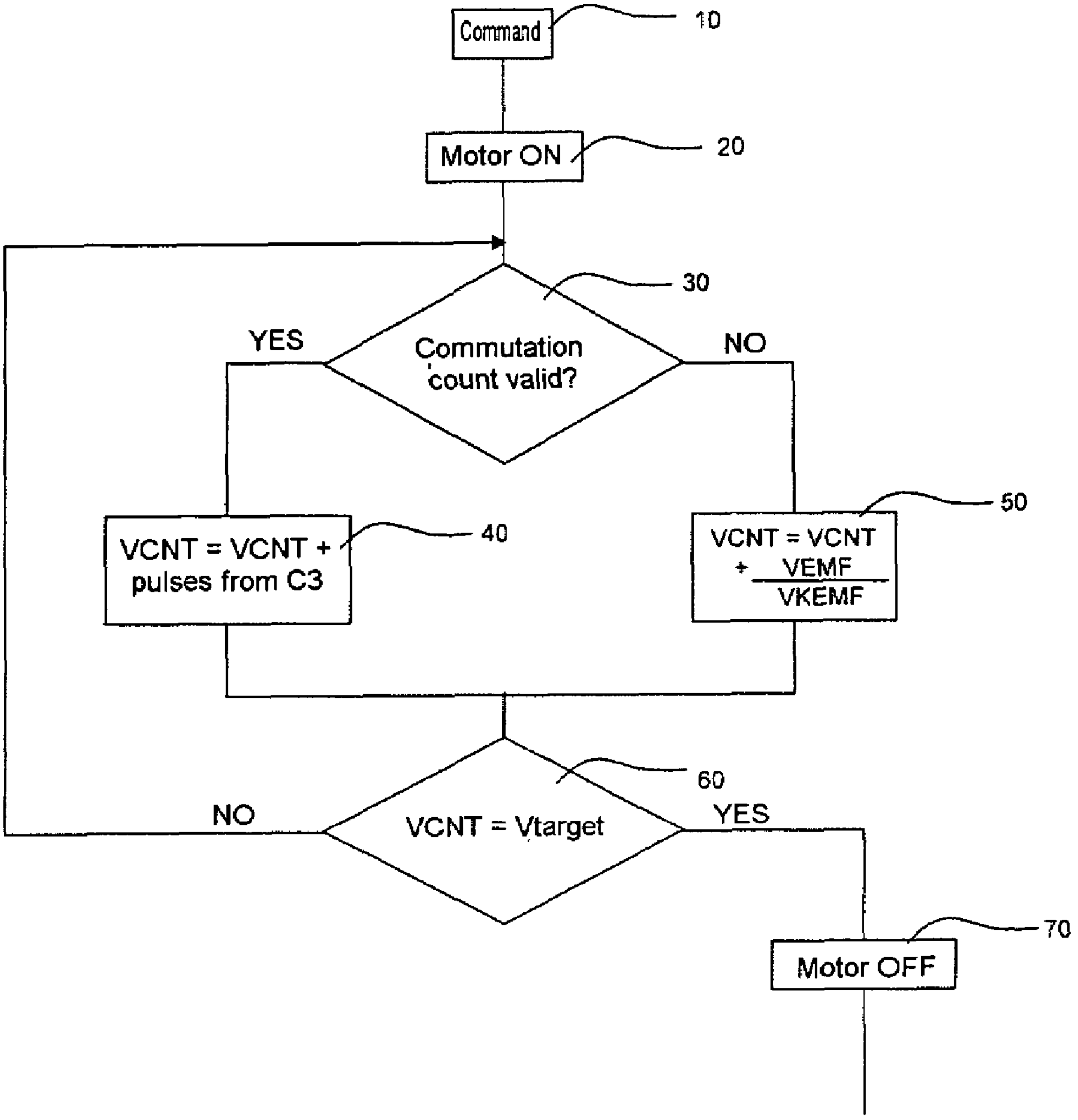
FIG. 3 is a flow diagram of a way of executing the method of determination according to the invention.

A procedure for operating the actuator according to the invention is described with reference to FIG. 3.

It is assumed that, in a first step 10, a user applies an action to a command sender and this action is interpreted by the actuator as a command to operate the moving element in order for the latter to reach a target position.

After receiving this command, in a step 20, the motor of the actuator is powered.

In a test step 30, the value VFRQ stored in the memory FRQ is tested.

If the value VFRQ stored in the memory FRQ is less than the speed threshold TR1, the step 50 is applied, in which, according to the direction of rotation of the motor, the counter CNT is incremented or decremented by using the measurement of the back electromotive force of the motor. VFRQ is less than the speed threshold TR1 in particular just after the start of the power supply to the motor because of the inertia of the rotor of the motor, the kinematic chain driving the moving element and the moving element.

In a test step 60, the current value VCNT of the counter CNT is tested.

If the value VCNT is equal to the value Vtarget corresponding to the target position of the moving element, the motor power supply is cut off in a step 70.

Otherwise, the procedure loops to the test step 30.

If the value VFRQ stored in the memory FRQ is greater than the speed threshold TR1, the step 40 is selected, in which, according to the direction of rotation of the motor, the counter CNT is incremented or decremented by using the signal supplied by the output C3 of the comparator CMP. Following this step, the procedure continues with the step 60 described previously.

The method is open to a number of variants.

It is, for example, possible for the calculation of the back electromotive force coefficient to be done at the moment when the speed of the rotor of the motor reaches the speed threshold TR1.

The threshold beyond which the voltage measurement ceases to be valid for calculating the position of the motor shaft and up to which the voltage measurement is valid for calculating the motor shaft position can be a back electromotive force threshold. In practice, at least over a range of speed values including the speed threshold TR1, the application giving the back electromotive force values as a function of the speed values is bijective. Thus, a back electromotive force value has a single corresponding rotor speed value.

On crossing the threshold, an action reducing the sensitivity of the commutation detection device, such as, in particular, selecting the "chopper" mode of operation for the controlled switch, can be carried out. In this case, the measurement of the electromotive force coefficient VKEMF is activated and the use of the back electromotive force value is enabled for calculating the position of the rotor before activating the "chopper" mode of operation of the controlled switch.

The threshold value can be a threshold value of current intensity circulating in the armature of the motor. Below a certain filtered current value, it is obvious that the amplitude of the unfiltered current ripples becomes insufficient for detecting the commutations and ensuring the validity of the signal from the output C3 of the comparator CMP. In this case, a second comparator is used. The voltage URS filtered by a low-pass circuit is applied to the first of its inputs, whereas a reference voltage greater than the voltage URF is applied to its second input. The output from the second comparator is applied to a third input of the microcontroller.

Generally, the method according to the invention consists in preferably using the counting of pulses as long as the latter is valid, and in using the back electromotive force otherwise. The counting validity periods are exploited to update the value of the electromotive force coefficient, so making it possible to best take account of the motor temperature.

Besides the use of threshold values on the speed of the motor or, in an equivalent manner, on its back electromotive force, it is possible to detect directly the validity of the counting of the pulses from the comparator CMP and corresponding to the commutations, by analyzing the regularity in time of said pulses. In practice, given the mechanical inertia of the moving assembly, it is impossible for the two time intervals separating three consecutive pulses to differ by a duration greater than a given time threshold value, unless a commutation detection error occurs.

This third threshold value, like the first threshold value relating to the speed or like the second threshold value relating to the back electromotive force is predetermined. In an embodiment variant, they are calculated, for example, as relative values. Thus, the first or the second threshold value is a fraction of the greatest value measured during a learning phase, whereas the third threshold value is a fraction of the lowest value measured during a learning phase. Such a calculation means that the threshold can be adapted to each type of motor and/or load.

The act of testing directly the validity of the counting of the pulses by means of a time-oriented test makes it possible to adapt immediately to a situation in which the interference signals become numerous, for example because of the operation of the step-down chopper. However, it is also possible to declare the counting not valid when the chopper is activated, so avoiding having to perform the time-oriented test.

For example, a way of executing the method consists, when a chopper activation phase is required:

in measuring the electromotive force coefficient and storing this value VKEMF in memory, in switching to the mode for measuring the speed and/or the displacement of the motor shaft by measuring the back electromotive force, in activating the chopper.

To simplify the above description, storing calculation values in several memories has been described. It will be obvious to those skilled in the art that only the value of the electromotive force coefficient of the motor needs to be stored in memory, between two updates. The other values, such as the frequency VFRQ, are stored only insofar as they are used in intermediate calculations.

The invention claimed is:

1. A method of determining the position and/or the speed of the shaft of a direct current motor (MOT) including an armature powered via brushes and a bar commutator and designed to drive a moving element (LD) of a building, which includes the following phases:

detecting and counting the commutations that occur between the brushes and the commutator bars to determine the position and/or the speed of the motor shaft when the commutation count is valid, and measuring the amplitude of the back electromotive force of the motor (MOT) to determine the position and/or the speed of the motor shaft when the commutation count is not valid.

2. The method as claimed in claim 1, wherein the commutation count is valid when the speed of the shaft is greater than a first threshold value.

3. The method as claimed in claim 1, wherein the commutation count is valid when the back electromotive force of the motor is greater than a second threshold value.

4. The method as claimed in claim 1, wherein the commutation count is valid when the amplitude of the armature current of the motor is greater than a third threshold value.

5. The method as claimed in claim 1, wherein the commutation count is valid when the time difference between two time intervals measured between three consecutive detected commutations is less than a fourth threshold value.

6. The method as claimed in claim 2, wherein the threshold value is predetermined.

7. The method as claimed in claim 3, wherein the threshold value is predetermined.

8. The method as claimed in claim 4, wherein the threshold value is predetermined.

9. The method as claimed in claim 2, wherein the threshold value results from a calculation.

10. The method as claimed in claim 3, wherein the threshold value results from a calculation.

11. The method as claimed in claim 4, wherein the threshold value results from a calculation.

12. The method as claimed in claim 1, wherein, when the commutation count is valid, the back electromotive force coefficient (VKEMF) of the motor linking the electromotive force and the speed of the rotor is calculated and stored in a memory (KEMF).

13. An actuator (ACT) for operating a moving element (LD) of the building, including:

a direct current motor (MOT) with an armature powered via brushes and a bar commutator, and means of counting commutations between the brushes and the bars of the commutator, which includes means of measuring the amplitude of the back electromotive force of the motor and means of inhibiting the use of the commutation counting means or the use of the means of measuring the amplitude of the back electromotive force of the motor to calculate the position and/or the speed of the motor shaft.

* * * * *